United States Patent
Seo et al.

(10) Patent No.: US 11,436,125 B2
(45) Date of Patent: Sep. 6, 2022

(54) GAME TEST AUTOMATION DEVICE AND METHOD

(71) Applicant: Netmarble Corporation, Seoul (KR)

(72) Inventors: Il Hwan Seo, Seoul (KR); Hyeon Woo Sim, Seoul (KR); Soo Man Yun, Seoul (KR); Sun Keun Shim, Seoul (KR); Dong Woo Lee, Seoul (KR); Sun Young Park, Seoul (KR); Yu Jin Han, Seoul (KR); Hye Jeong Jeong, Seoul (KR); Su Jin Park, Seoul (KR)

(73) Assignee: Netmarble Corporation, Seoul (KR)

( * ) Notice: Subject to any disclaimer, the term of this patent is extended or adjusted under 35 U.S.C. 154(b) by 211 days.

(21) Appl. No.: 16/638,847

(22) PCT Filed: Aug. 13, 2018

(86) PCT No.: PCT/KR2018/009233
§ 371 (c)(1),
(2) Date: Feb. 13, 2020

(87) PCT Pub. No.: WO2019/035610
PCT Pub. Date: Feb. 21, 2019

(65) Prior Publication Data
US 2020/0192788 A1 Jun. 18, 2020

(30) Foreign Application Priority Data

Aug. 16, 2017 (KR) .................. 10-2017-0103543

(51) Int. Cl.
*A63F 13/77* (2014.01)
*G06F 11/36* (2006.01)
(Continued)

(52) U.S. Cl.
CPC .......... *G06F 11/3664* (2013.01); *A63F 13/77* (2014.09); *G06F 11/3485* (2013.01);
(Continued)

(58) Field of Classification Search
CPC ............ G06F 11/3664; G06F 11/3684; G06F 11/3608; G06F 11/3409; G06F 11/3672;
(Continued)

(56) References Cited

U.S. PATENT DOCUMENTS

2007/0105607 A1* 5/2007 Russell ............... G06F 11/0709
714/E11.207
2012/0204153 A1* 8/2012 Peterson ............. G06F 11/3672
717/124
(Continued)

FOREIGN PATENT DOCUMENTS

KR 20080087918 10/2008
KR 20090122665 12/2009
(Continued)

OTHER PUBLICATIONS

Pablo Moreno et al., Usability Testing for Serious Games: Making Informed Design Decisions with User Data, 2012, [Retrieved on Jun. 7, 2022], Retrieved from the internet: <URL: https://dl.acm.org/doi/pdf/10.1155/2012/369637> 13 Pages (1-13) (Year: 2012).*
(Continued)

*Primary Examiner* — Anibal Rivera
(74) *Attorney, Agent, or Firm* — Boyle Fredrickson S.C.

(57) ABSTRACT

Disclosed is a game test automation device capable of automating a game test. The game test automation device can comprise: a database for storing test procedure information, which is a combination of game scripts to be tested in a game service; and a testing unit for testing game build of the game service on the basis of the test procedure information, and creating game state information derived in the testing process and a test report on the test.

19 Claims, 7 Drawing Sheets

(51) Int. Cl.
　　　*G06F 11/34*　　　(2006.01)
　　　*G06F 11/30*　　　(2006.01)
　　　*G06F 11/22*　　　(2006.01)
(52) U.S. Cl.
　　　CPC ...... *G06F 11/3668* (2013.01); *G06F 11/3684* (2013.01); *A63F 2300/209* (2013.01); *G06F 11/2221* (2013.01); *G06F 11/2294* (2013.01); *G06F 11/3414* (2013.01); *G06F 11/3433* (2013.01); *G06F 11/3452* (2013.01); *G06F 11/3672* (2013.01); *G06F 11/3688* (2013.01); *G06F 11/3692* (2013.01)
(58) Field of Classification Search
　　　CPC .. G06F 17/3225; G06F 17/3241; G06F 17/32; G06F 17/329; G06F 11/3466; G06F 11/3495; G06F 11/3616; G06F 11/3688; G06F 11/3676; G06F 11/2221; G06F 11/2294; G06F 11/263; G06F 11/3457; G06F 11/3485; G06F 11/368; G06F 11/3668; G06F 11/3414; G06F 11/3433; G06F 11/3452; G06F 11/362; G06F 11/3692; A63F 13/77; A63F 13/33; A63F 13/10; A63F 13/35; A63F 13/48; A63F 13/352; A63F 2300/209; A63F 13/58; A63F 13/67; A63F 13/833; A63F 13/30; A63F 13/50; A63F 13/52; A63F 13/70; A63F 2300/5533
　　　See application file for complete search history.

(56)　　　　　References Cited

U.S. PATENT DOCUMENTS

| | | | |
|---|---|---|---|
| 2013/0040740 | A1* | 2/2013 | Lee ....................... A63F 13/358 463/42 |
| 2013/0054790 | A1* | 2/2013 | Sohn ................... G07F 17/3223 709/224 |
| 2013/0137498 | A1* | 5/2013 | Willyard ............. G06F 11/3688 463/16 |
| 2019/0034319 | A1* | 1/2019 | Boniecki ............. G06F 11/3608 |
| 2019/0351332 | A1* | 11/2019 | Sucharov ................ A63F 13/63 |

FOREIGN PATENT DOCUMENTS

| | | |
|---|---|---|
| KR | 20100062797 | 6/2010 |
| KR | 101118902 | 2/2012 |
| KR | 101199485 | 11/2012 |
| KR | 20130043572 | 4/2013 |

OTHER PUBLICATIONS

Lee, Jongwon, Test Design Technique, http://www.slideshare.net/daunjae/istqb-4201521, Apr. 21, 2015.

* cited by examiner

| Preprocessing script |
| --- |
| • Preprocessing script ① (log in) |
| • Preprocessing script ② (empty storage) |
| Main script |
| • Main script ① |
| • Main script ② |
| • Main script ③ |
| Post-processing script |
|  |

GAME TEST AUTOMATION DEVICE AND METHOD

CROSS-REFERENCE TO RELATED APPLICATIONS

This application is a U.S. national stage application of International Application No. PCT/KR2018/009233 filed on Aug. 13, 2018, which claims the benefit of Korean Patent Application No. 10-2017-0103543, filed on Aug. 16, 2017, in the Korean Intellectual Property Office, the entire disclosures of which are incorporated herein by reference for all purposes.

TECHNICAL FIELD

The following description relates to a game test automation device and method.

BACKGROUND ART

Because a game service is configured based on graphics, unlike a text-based program, it may be difficult for a computer to automatically identify situations in the game service. Thus, to test a game build of the graphic-based game service, as a tester who tests the game build directly performs a separate game play to verify whether there is an error in the game build. Due to this, there is a need for a plurality of tester manpower for proceeding with the test. Furthermore, a scenario for performing the test is written based on text sentences, there may be communication problems in which a scenario intended by a developer and a scenario recognized by a tester are not identical to each other.

DISCLOSURE OF INVENTION

Technical Solution

According to an aspect of the present invention, there is provided a game test automation device including a database to store test procedure information which is a combination of game scripts to be tested in a game service and a testing unit to perform a test on a game build of the game service based on the test procedure information and generate game state information derived in the process of performing the test and a test report for the test.

The game test automation device according to an embodiment may further include a communication unit to perform communication with a test device which performs a test of the game service. The testing unit may generate a control signal for controlling the test device to perform a test on a game build of the game service through the test device and may transmit the generated control signal to the test device via the communication unit, may perform the test on the game build through the test device based on the transmitted control signal, and may generate test result information about the test.

The game test automation device according to an embodiment may further include a game script and test procedure management unit to manage the game scripts and the test procedure information. The game script and test procedure management unit may generate the game scripts or the test procedure information based on a user input.

In the game test automation device according to an embodiment, the test procedure information may include information about an order where game scripts included in the test procedure information are executed, the procedure information may include information about game scripts executed at the same time by a plurality of test devices among game scripts included in the procedure information, and the test report may include at least one of information about a result of the performed test, information about performance of the test device in which the test is performed, log information, and image information including a situation where the test is performed.

According to another aspect of the present invention, there is provided a game test automation method including generating test procedure information which is a combination of game scripts to be tested in a game service, performing a test on a game build of the game service based on the generated test procedure information, and generating game state information derived in the process of performing the test and a test report for the test.

In the game test automation method according to an embodiment, the performing of the test may include generating a control signal for controlling a test device to perform a test in the test device and transmitting the generated control signal to the test device. The generating of the test result information may be to generate game state information derived in the process of performing the test performed in the test device and a test report for the performed test.

In the game test automation method according to an embodiment, the test report may include at least one of information about a result of the performed test, information about performance of a test device in which the test is performed, log information, and image information including a situation where the test is performed.

BEST MODE FOR CARRYING OUT THE INVENTION

Structural or functional descriptions of embodiments are disclosed for the purpose of being merely illustrative and may be modified and executed in various forms. Therefore, the scope of the specification is not limited to specific forms of disclosed embodiments, and includes changes, equivalents, or substitutes included in the described technical scope.

Terms such as "first" and "second" may be used in describing various components, but it should be interpreted that such terms are used only to distinguish one component from the other. For example, a first component may be referred to as a second component, and similarly, a second component may be referred to as a first component.

It will be understood that when a component is referred to as being "coupled with/to" or "connected to" another component, it may be directly coupled with/to or connected to the other component or an intervening component may be present.

The expression of singular number includes the expression of plural number unless clearly intending otherwise in a context. In the specification, it should be understood that terms of 'comprise', 'have', and the like are to designate the existence of a feature disclosed in the specification, a numeral, a step, an input, a constituent element, a part, or a combination thereof, and do not previously exclude a possibility of existence or supplement of one or more other features, numerals, steps, inputs, constituent elements, parts, or combinations thereof.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the inventive concept.

When an embodiment may be accomplished in different ways, a function or an operation specified in a particular block may be performed in an order that is different from that illustrated in a flowchart. For example, functions or operations specified in continuous two blocks may be actually substantially simultaneously performed or may be performed in reverse order, according to a related function or operation.

Hereinafter, a description will be given in detail of embodiments with reference to the accompanying drawings. In describing embodiments with reference to the accompanying drawings, the same reference denotations are assigned to the same elements without regard to the drawing denotations, a duplicated description thereof will be omitted.

A game test automation device may refer to a device which performs a test on a game service, such that a tester does not directly perform a game play, by automatically performing the test on the game service based on a predetermined test scenario. Herein, the test may refer to an operation of verifying whether a game build of the game service operates as intended by a developer. The term "game build" may refer to an execution file the game test automation device wants to finally test. The term "script" may refer to a test scenario written with codes such that the test automatically proceeds. Furthermore, the term "test procedure" may refer to a combination of scripts, which is generated such that a plurality of scripts may proceed in the test process.

Figure 1:
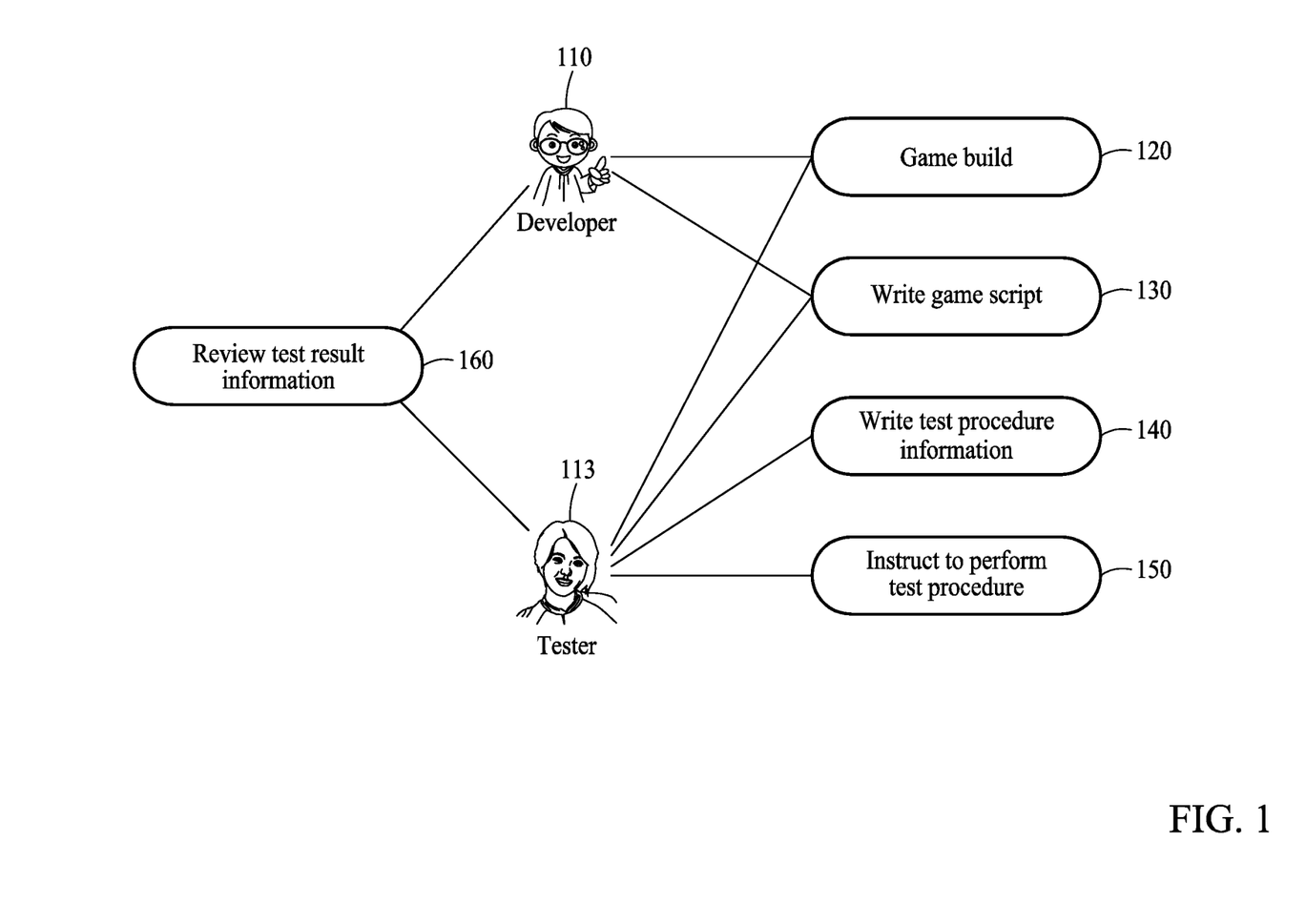
FIG. 1 is a flowchart illustrating a game test automation method in view of a developer and a tester according to an embodiment.

FIG. 1 is a flowchart illustrating a game test automation method in view of a developer and a tester according to an embodiment.

Referring to FIG. 1, a developer 110 may develop a game build 120 and may upload the developed game build 120 to the Internet. Because the developed game build 120 is able to include an error which is not intended by the developer 110, to verify whether the game build 120 operates as intended by the developer, the developed game build 120 may be tested. The developer may directly write a game script to test the game build 120 through process 130.

The game build 120 may be installed on a test device of a tester 113 to proceed with a test, and the tester 113 may write a game script for testing the game build 120 through process 130. Furthermore, the tester 113 may write test procedure information in which the written game scripts are combined, through process 140. The tester 113 may instruct the test device to perform a test procedure, through process 150. For example, a time point on the game build 120 in which the test procedure is executed may be determined by the tester 113. When the time point set by the tester 113 arrives, the game test automation device may automatically perform a test based on the test procedure information. The tester 113 may reserve time for the game test automation device to start to perform a test, and the game test automation device may start to test the game build 120 in the time reserved by the tester 113. In process 160, the tester 113 and the developer 110 may enhance the game build by reviewing test result information generated in the process of performing the test, identifying an error on the game build through the test result information, and correcting the identified error.

Figure 2:
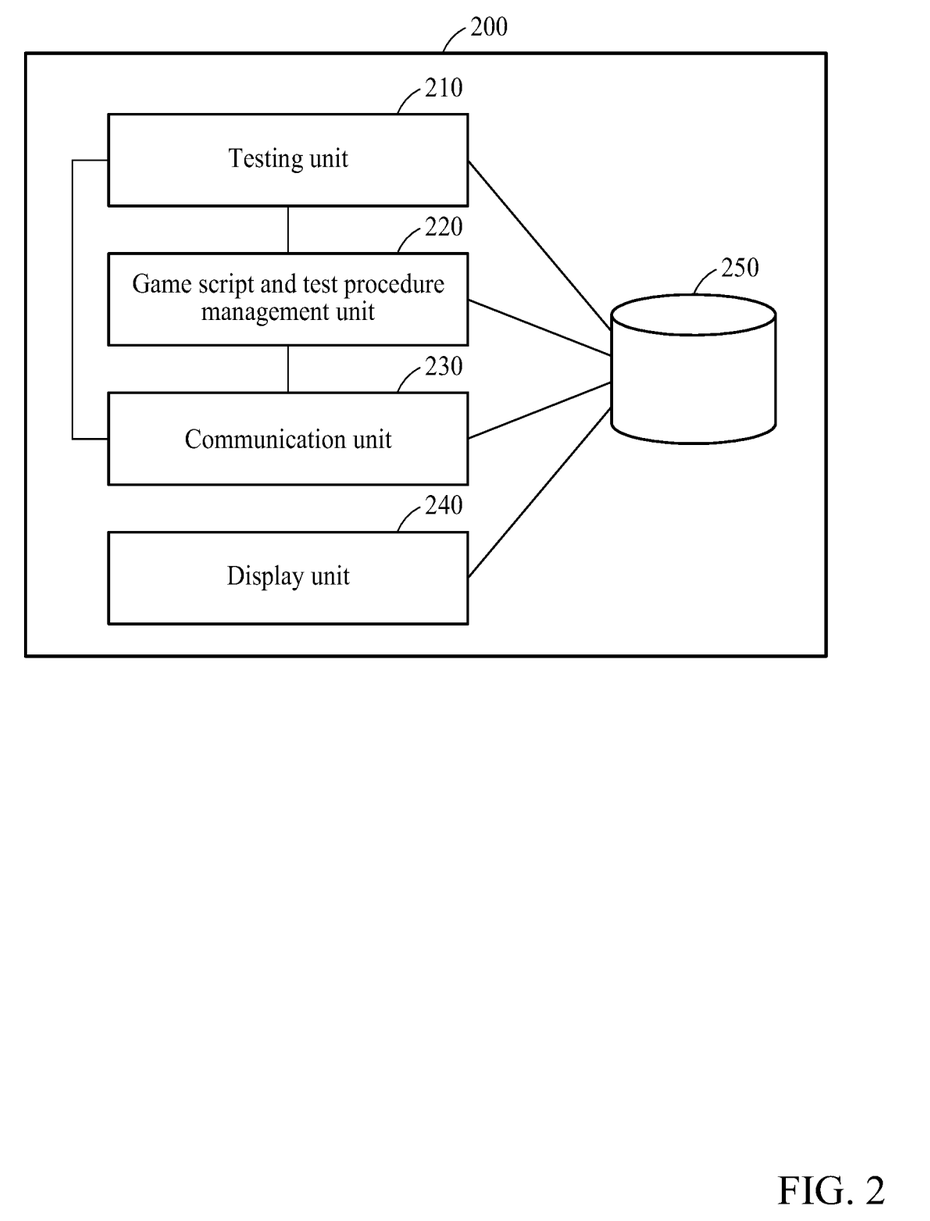
FIG. 2 is a drawing illustrating an overall configuration of a game test automation device according to an embodiment.

FIG. 2 is a drawing illustrating an overall configuration of a game test automation device according to an embodiment.

Referring to FIG. 2, the game test automation device may include a game script and test procedure management unit 220 for managing a game script and a test procedure, a database 250 for storing information about a game build, a game script, and test procedure information, a testing unit 210 for performing a test on a game build of a game service based on the test procedure information, a communication unit 230 for performing communication with an external test device, and a display unit 240 for displaying a test progress situation. The operation of the game script and test procedure management unit 220 and the testing unit 210 of the game test automation device may be performed by a processor which a device component included in the game test automation device.

According to an embodiment, the game script and test procedure management unit 220 may generate game scripts or test procedure information, in which the game scripts are combined, based on a user input. A detailed method of generating the game scripts and the test procedure information will be described in detail with reference to FIGS. 3 and 4. The game scripts and the test procedure information generated by the game script and test procedure management unit 220 may be stored in the database 250. A game build of a game service may also be stored in the database 250. As the stored game build is analyzed in advance, information about the game build, such as capacity, a version, or a loaded module, may be determined.

The testing unit 210 may perform a test on the game build of the game service, stored in the database 250, based on the test procedure information stored in the database 250. For example, the testing unit 210 may determine whether to perform a test on any of game builds stored in the database 250 based on a user input based on any test procedure among test procedure information stored in the database 250 and may determine whether to perform an operation corresponding to a test procedure determined at any time of the determined game build. The testing unit 210 may generate game state information derived in the process of performing the test on the game build and test result information of the test. Furthermore, when a test proceeds by an external test device, the testing unit 210 may control the test device by generating a control signal for controlling the test device to perform the test on a game build of the game service through the test device and transmitting the generated control signal to the test device via the communication unit 230. The test on the game build may be performed in the test device based on the control signal, and the testing unit 210 may generate game state information and test result information based on information about the test performed in the test device.

The game state information may include information about various states in the game service. For example, the game state information may include information about a specific image in the game service (e.g., information about what a specific image object is), information about a specific character, or information about a current situation (e.g., an item purchase situation) of the game service.

The game state information may be determined through image recognition. For example, an image or text in the game service may be recognized through an optical character reader (OCR). Furthermore, the game state information may be determined based on a library embedded in a game build of the game service. For example, the library embedded in the game build may include text data corresponding to game state information, and the testing unit 210 may determine information about a game state based on the text data included in the library embedded in the game build. For example, the game test automation device may obtain text data for a current test situation from the library and may determine information about a current game state based on it. Furthermore, the library embedded in the game build may include text information corresponding to an image object in the game service or information associated with an abstract remote procedure call (RPC). In another example, the game state information may be determined based on log information generate in the process of performing the test. For example, the testing unit 210 may determine information about a game state by analyzing log information generated in the process of performing the test in the test device. The log information may be obtained through log hooking through a separate web proxy server.

According to an embodiment, the test report may include at least one of information about the test result, information about performance of the test device in which the test is performed, log information, or image information including a situation where the test is performed.

The information about the test result information may include test result information about a separate game script included in test procedure information. When it is determined that at least one of separate test cases included in the separate game script is in an exceptional state, the testing unit 210 may determine that an error occurs in the test of the game script. When it is determined that at least one test case is in a failed state, the testing unit 210 may determine that the test of the game script fails. Furthermore, although there is no test case determined as being in the exceptional state or the failed state, when it is determined that at least one test case is in an unexecuted state, the testing unit 210 may determine that the test of the game script is being executed. When it is determined that all the test cases are in a successful state, the testing unit 210 may determine that the test of the game script succeeds. When a compulsory termination request occurs based on a user input while the test is performed, the testing unit 210 may determine that the test of the game script is terminated.

The information about the test device performance may include information about time series usage for a CPU, a memory, a battery, or the like of the test device in which the test is performed.

According to an embodiment, the log information included in the test report may include at least one of image information in which a test situation is captured, text information about the test situation, its own log information of the test device, or web transmission log information called by the test device in the process of performing the test. For example, the image information may include image information in which the test situation is captured over a predetermined time period. The test information may include information about a progress situation and a current state of a test scenario for each test interval. The test device log information may be log information the test device records itself. The test device log information may be used to verify a termination cause when the test is abnormally terminated. The web transmission log information may be web transmission log information the test device calls for each test interval.

According to an embodiment, the image information including the situation where the test is performed, included in the test report, may correspond to video information in which all of the process of performing the test is performed.

Figure 5:
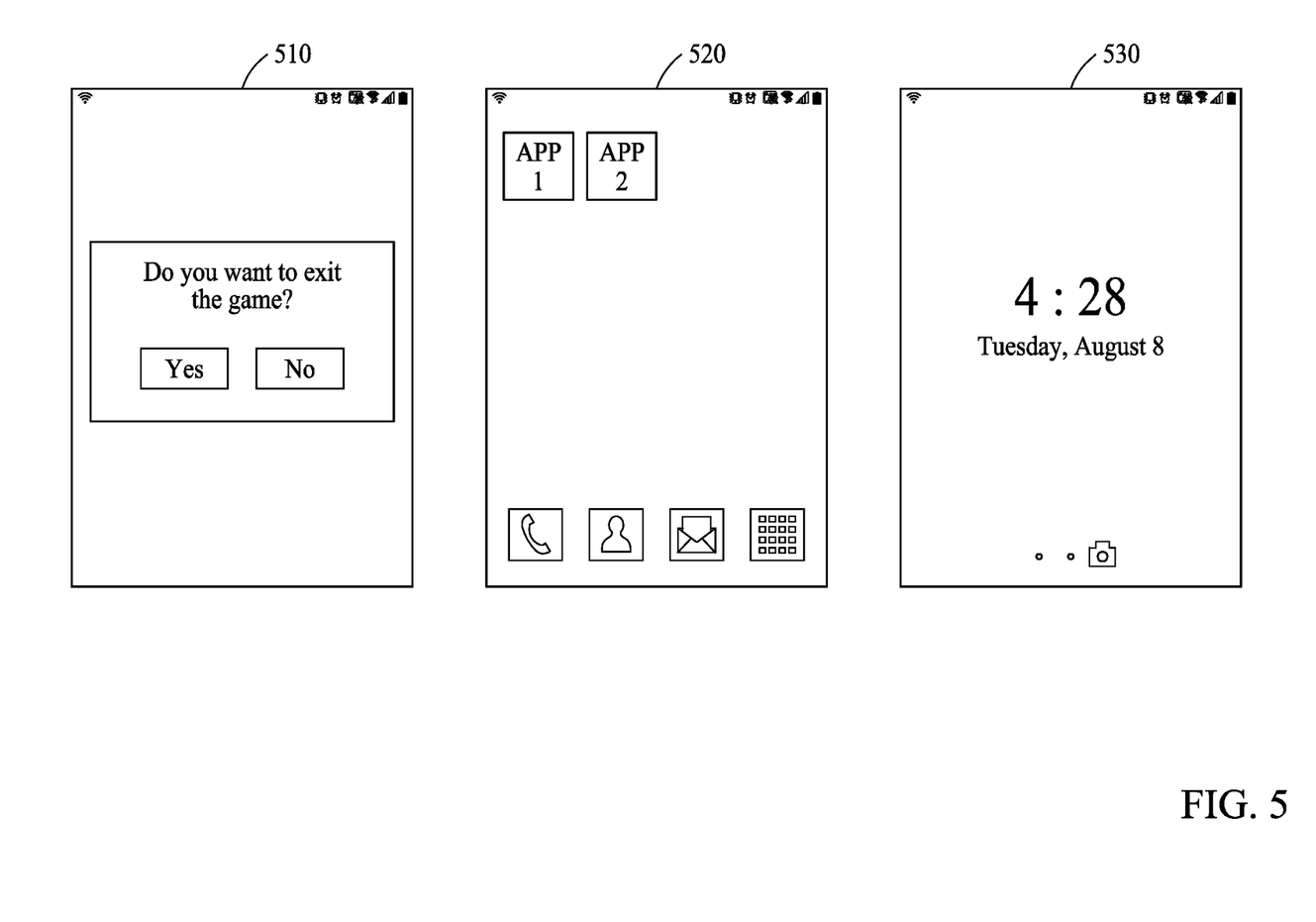
FIG. 5 illustrates an example of screens of a test device displayed on a display unit of a game test automation device according to an embodiment.

According to an embodiment, the display unit 240 may display the situation where the test is performed. For example, the display unit 240 may display the situation where the test is performed by the game test automation device in real time or, when a test on a game build proceeds by an external test device, may display a screen of the test device in which the test is performed in real time. Furthermore, when controlling a plurality of test devices, the game test automation device may display a current screen of each of the plurality of test devices in real time. The game test automation device may display a current screen of each of the plurality of test devices in real time on its embedded display or may provide information about the current scree of each of the plurality of test devices to a user terminal in which an application associated with the game test is installed. A tester may recognize a test progress situation which progresses in each test device through the display unit 240 and may identify an available test device through it. An example in which the test situation is displayed on the display unit 240 is shown in FIG. 5.

Figure 3:
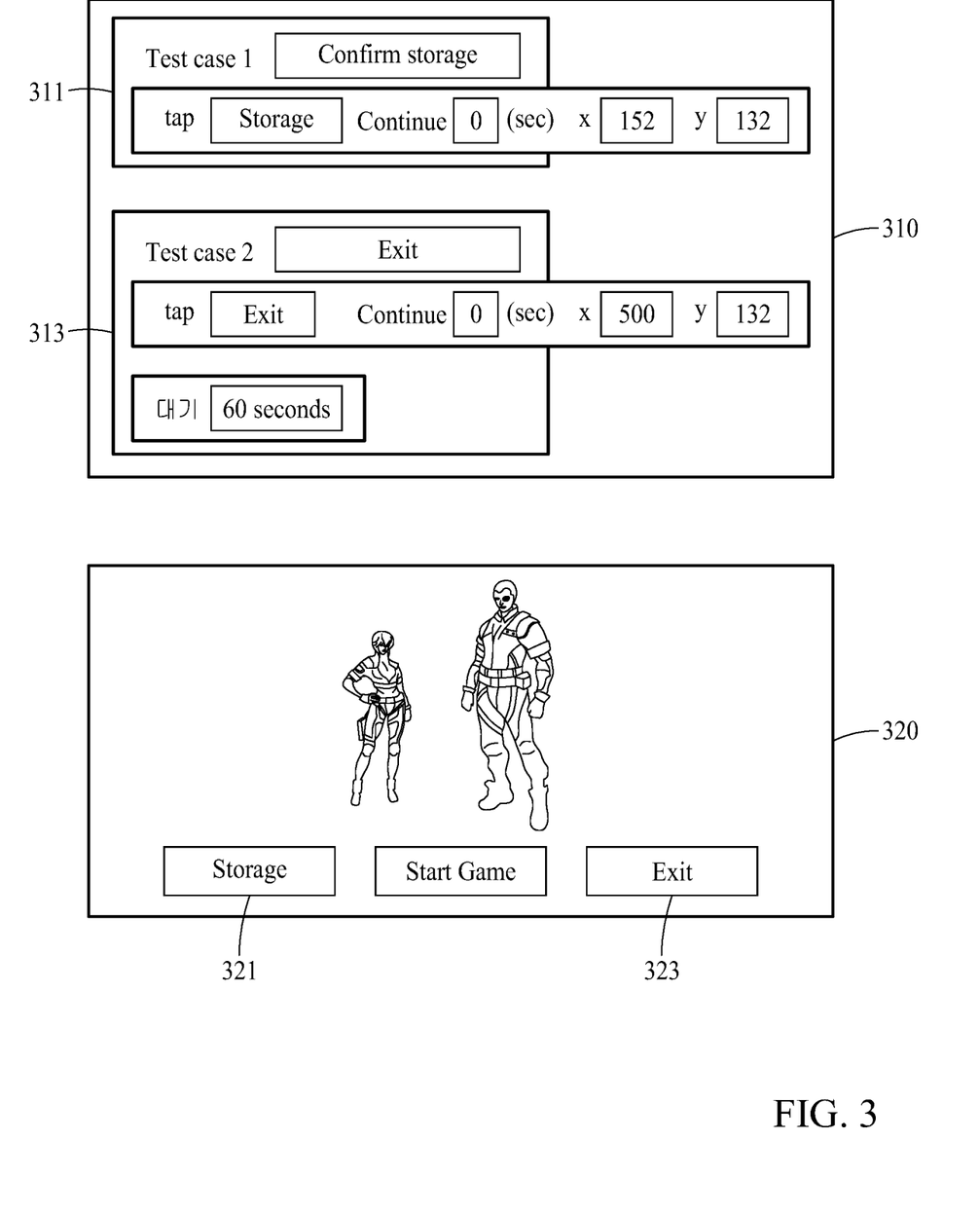
FIG. 3 is a drawing illustrating an example of a screen for describing a method of generating a game script according to an embodiment.

FIG. 3 is a drawing illustrating an example of a screen for describing a method of generating a game script according to an embodiment.

A game test automation device may provide an interface for generating a game script to a separate user terminal or a test device, in which an application associated with generating a game script is installed.

Screen 320 shows an interface provided to the user terminal or the test device to receive an input for generating a game script. An interface for receiving a user input, presented on screen 320, may be the same interface as a game play interface provided to the user terminal when providing a game service or may include the same interface region as the game play interface and an input interface region, associated with operations for generating a game script, together. The game test automation device may receive an input for generating a game script in a manner similar to the manner where a game play proceeds, through the interface displayed on screen 320. For example, the user input for generating the game script may be performed in the same manner as the manner which proceeds with the game play (e.g., proceeding with a touch for selecting a characters to be used for the game play, selecting an item to be used on a screen connected by touching a storage 321, and return to a previous screen to press a game start button or an exit button 323) on the screen 320. A game script and test procedure management unit of the game test automation device may generate and display a game script corresponding to contents, input through screen 320, on screen 310.

Screen 310 may display an interface which shows each element of the game script in the form of a block. The game script and test procedure management unit may generate a game script by generating the user input which proceeds in the same manner as the manner which proceeds with the game play as a test case for each operation. For example, when the user input is performed in such a manner as to tap the storage button 321, tap the exit button 323, and wait for 60 seconds on screen 310 by a tester or a developer, the game script and test procedure management unit may generate a game script by generating a test case 311 or 312 for each operation, and information corresponding to the generated game script may be displayed as screen 310. The generated game script may include the test case 1 311 associated with confirm the storage and the test case 2 313 associated with an exit operation. Each test case 311 or 313 may include information about operation contents of a user input (e.g., a tapping operation on a button, a dragging operation, an operation proceeding with a consecutive touch, or the like), an operation performance location (e.g., location coordinates of a button, location coordinates at which an operation is performed, any location on an interface where a touch proceeds, or the like), information about an order where operations are performed (e.g., a storage is first confirmed, and an exist button is then touched), information about duration of the operation (e.g., wait for 60 seconds, touch is performed for 10 seconds, or the like), or the like.

Moreover, the game test automation device may provide a game script and test procedure information corresponding to a user input performed in the same manner as the manner to proceed with the game play, based on text used in a conventional manner. For example, the game test automation device may previously store a game script in the form of text corresponding to a user input corresponding to each operation and may provide a game script in the form of text corresponding to the user input based on the stored game script.

The game test automation device may provide a user input means which generates a game script in a more visible manner than a manner to write a text scenario based on a text sentence by generating a game script through the user input performed in the same manner as the manner to proceed with the game play.

In addition, the game test automation device may provide a means capable of writing game scripts for various types of operations depending on a form of a user input other than a predefined operation by obtaining information about operation contents of the user input, information about an operation performance location, information about an order where operations are performed, information about duration of the action, or the like and writing the game script. The game test automation device may provide a testing manner with higher freedom to a user by providing a means capable of writing a game script for various types of operations which are not previously defined.

Figure 4:
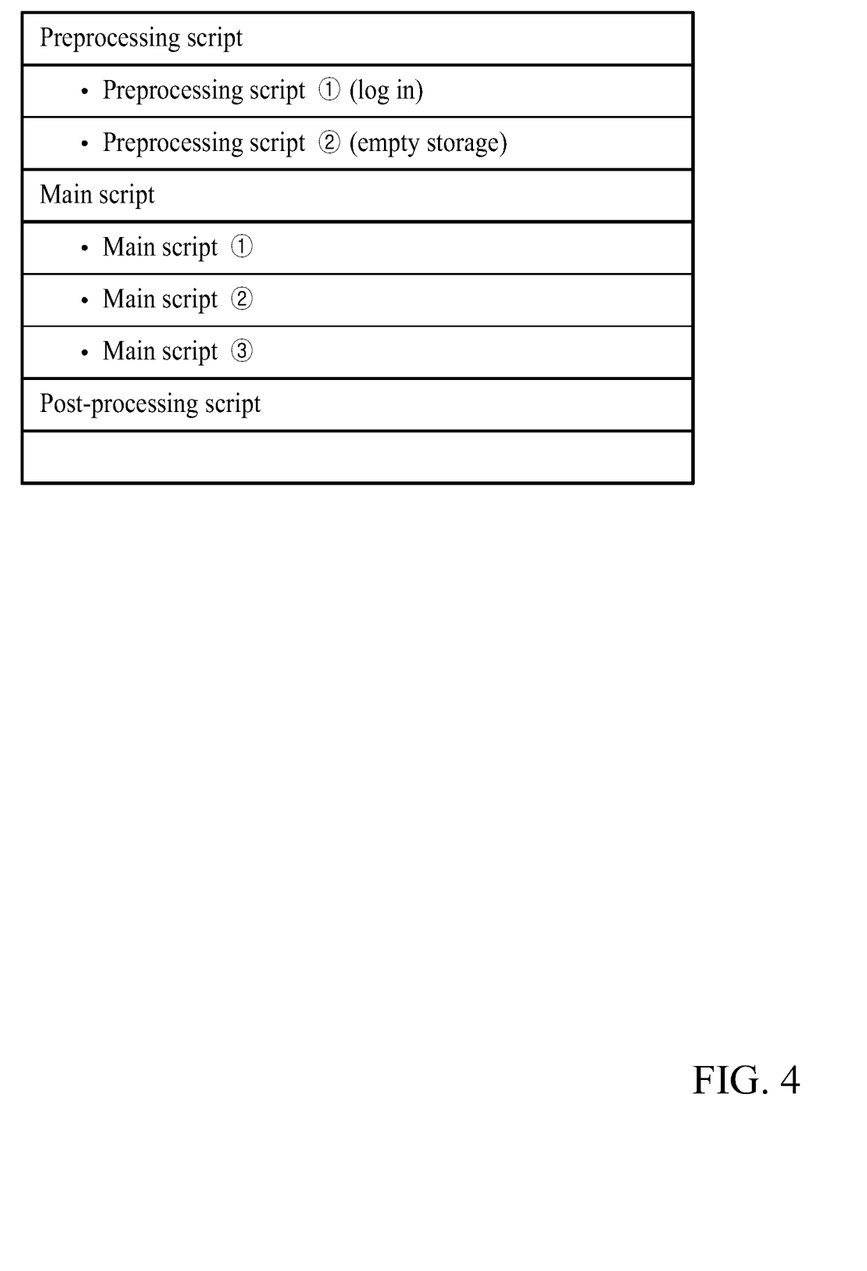
FIG. 4 is a drawing illustrating an example of a test procedure generated by a game script and test procedure management unit according to an embodiment.

FIG. 4 is a drawing illustrating an example of a test procedure generated by a game script and test procedure management unit according to an embodiment.

According to an embodiment, test procedure information may be determined by a combination of game scripts. Furthermore, the test procedure information may include information about an order where game scripts included in the test procedure information are executed. For example, the test procedure information may include a preprocessing script performed before a main script is performed, the main script, and a post-processing script executed after the main script is executed. Scripts included in a procedure may be executed in an order where the preprocessing script, the main script, and the post-processing script. The preprocessing script may be a script performed before the main script is performed, which may include, for example, a log-in operation, or an operation of emptying a storage before filling the storage. The main script may be primary scripts to be tested. Referring to FIG. 4, the main script may be executed in an order of main script 1, main script 2, and main script 3. The post-processing script may refer to a script executed after the main script is executed and may include an operation of performing a state change to a state before corresponding operations are performed. Contents, an order, and the like of an operation included in each script are not limited to the example given.

According to an embodiment, the test procedure information may include information about game scripts executed at the same time by a plurality of test devices among game scripts included in the procedure information. For example, main script 1, main script 2, and main script 3 included in the main script may each be executed at the same time by a separate test device, and information about the scripts executed at the same time may be included in the test procedure information through a separation indication. Efficiency of time of the test may be more increased when the main scripts are simultaneously executed and tested in parallel through different test devices than when the main scripts are sequentially executed. Such a point causes the game test automation device which proceeds with a continuous test through the test device to provide a more effective test scheduling scheme.

FIG. 5 illustrates an example of screens of a test device displayed on a display unit of a game test automation device according to an embodiment.

Referring to FIG. 5, a display unit of a game test automation device may display real-time screens of three test devices. The example given shows a situation where the test device corresponding to screen 510 is currently performing a test and where the test devices the other screens 520 and 530 do not currently perform the test. In this case, the test devices corresponding to the screen 520 and 530 may be determined as test devices for additionally performing a test.

Figure 6:
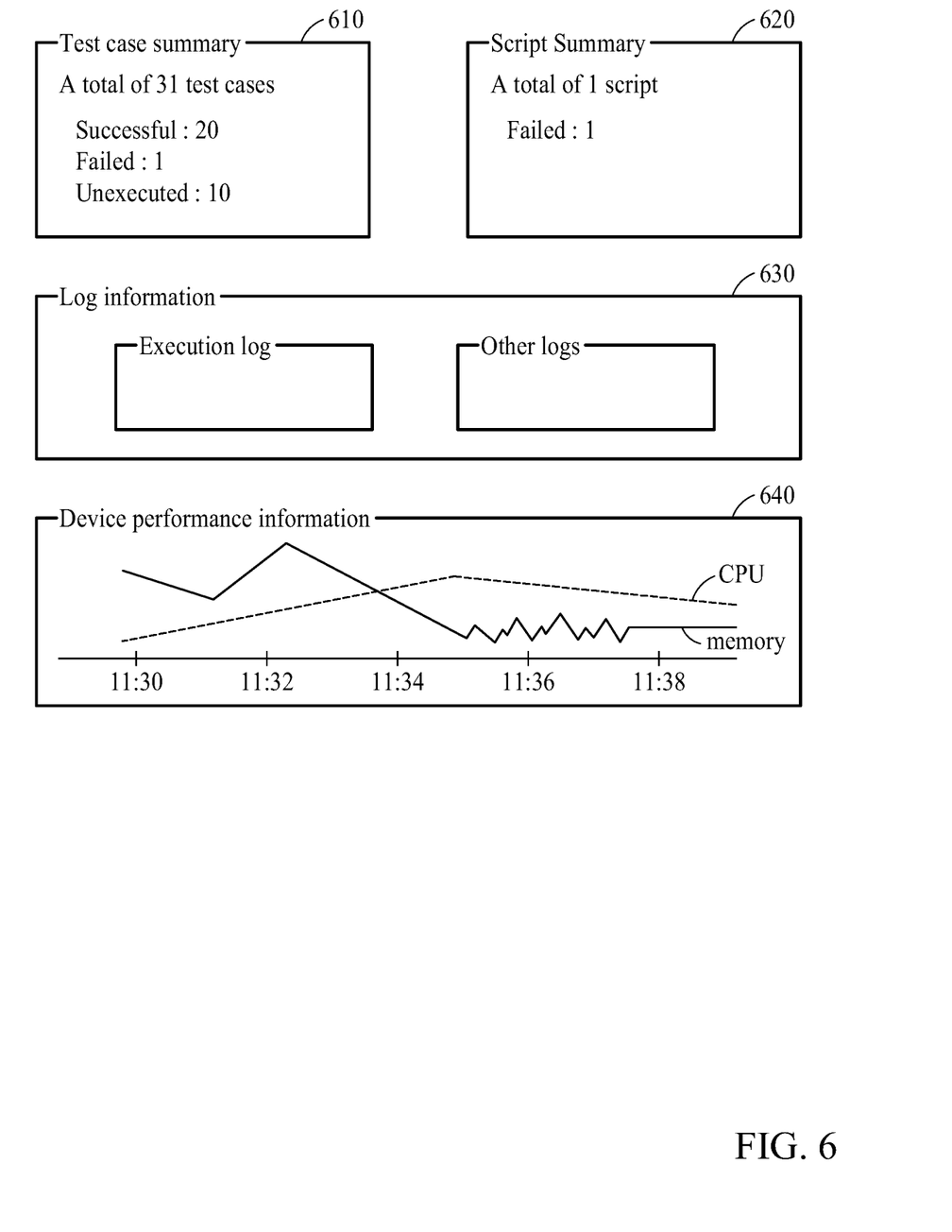
FIG. 6 illustrates an example of a test report generated by a test automation device according to an embodiment.

FIG. 6 illustrates an example of a test report generated by a test automation device according to an embodiment.

A region 610 including information about the result of testing test cases included in a game script, a region 620 including information about the result of testing the game script, a region 630 including log information, and a region 640 including performance information of the test devices may be included.

Referring to the region 610, it may be seen that 20 test cases among a total of 31 test cases are determined as a successful state, 10 test cases are determined as an unexecuted state, and 1 test case is determined as a failed state. Referring to the region 620, it may be seen that the game script is determined as being failed because the 1 test case is determined as the failed state. The region 630 may present a log generated as the test is performed and other log information, and the region 640 may provide time series use information of a CPU, a memory, or the like of the test device.

Figure 7:
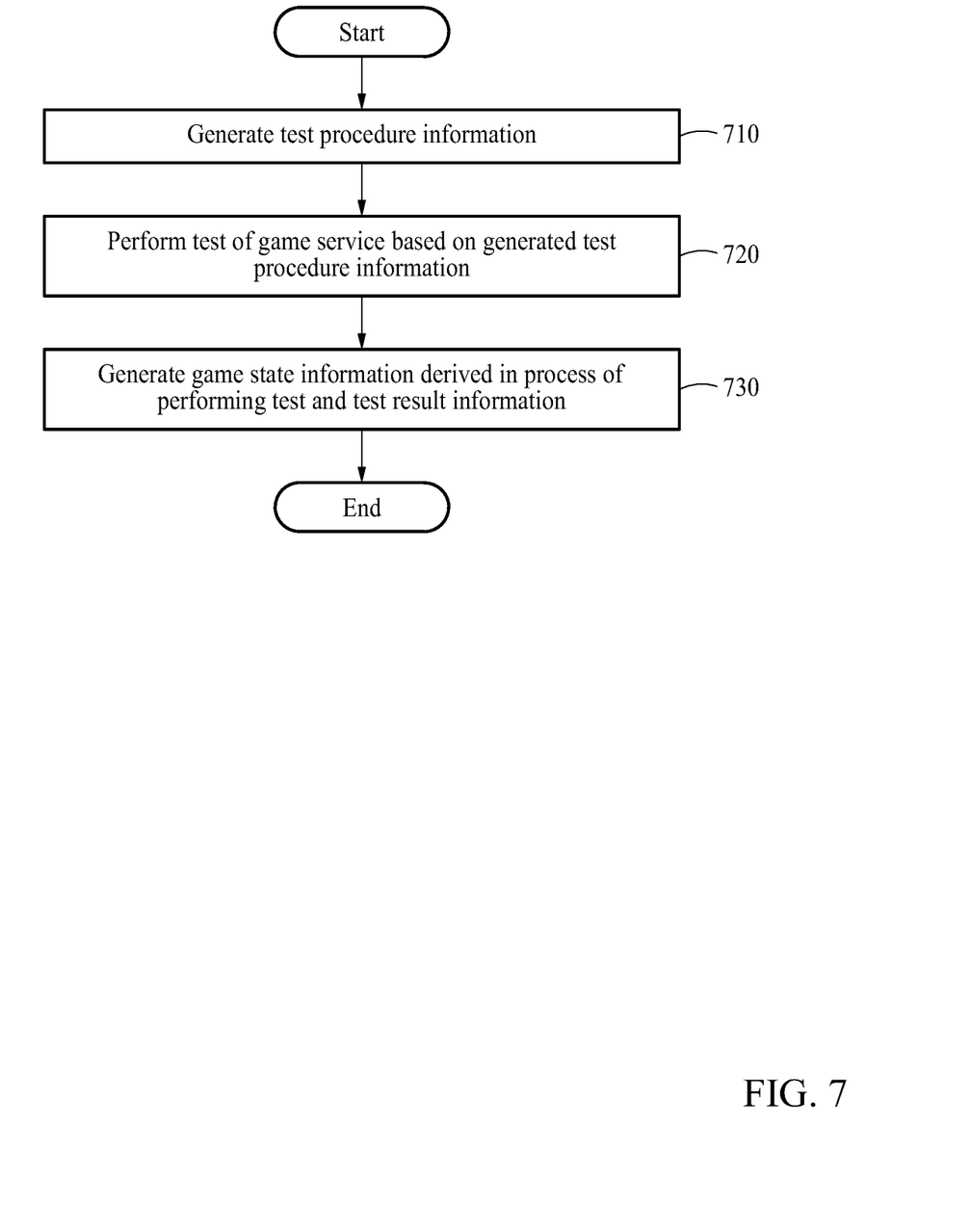
FIG. 7 is a flowchart illustrating a game test automation method by a game test automation device according to an embodiment.

FIG. 7 is a flowchart illustrating a game test automation method by a game test automation device according to an embodiment.

Referring to FIG. 7, in step 710, a game test automation device may generate test procedure information which is a combination of game scripts to be tested in a game service. The test procedure information may include information about an order where the game scripts are executed and information about game scripts performed at the same time by a plurality of test devices.

In step 720, the game test automation device may perform a test on a game build of the game service based on the generated test procedure information. The game scripts included in the test procedure information may be executed at a specific time in the game build determined based on a user input. As the game scripts are executed, it may be identified that an error which is not intended by a developer occurs on the game build, and, as a result, the error inherent in the game build may be detected. When a test on the game build is performed by an external test device, the game test automation device may generate a control signal for controlling the test device to cause the test device to perform the test on the game build, may transmit the generated control signal, and may generate game state information derived in the process of performing the test performed in the test device and a test report for the performed test. The test report may include at least one of information about the test result, information about performance of the test device in which the test is performed, log information, and image information including a situation where the test is performed.

In step 730, the game test automation device may generate the game state derived in the process of performing the test and the test report for the test.

Components described in embodiments may be implemented by a hardware component including one or more of programmable logic elements, such as one or more digital signal processors (DSPs), processors, controllers, application specific integrated circuits (ASICs), and field programmable gate arrays (FPGAs), other electronic devices, and a combination thereof. At least some of processes or functions described in embodiments may be implemented by software, and the software may be stored in a storage medium. Components, functions, and processes described in embodiments may be implemented by a combination of hardware and software.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

While embodiments have been shown and described with reference to the accompanying drawings as describe above, it will be apparent to those skilled in the art that various modifications and variations may be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

The invention claimed is:

1. A game test automation device, comprising:
   a database to store test procedure information which is a combination of game scripts to be tested in a game service; and
   a processor to perform a test on an Internet game build of the game service based on the test procedure information,
   wherein the processor performs the test on the Internet game build by controlling a test device to use a game play interface to interact with the Internet game build based on the test procedure information obtained from the database and generates game state information derived in the process of performing the test and a test report for the test,
   wherein the processor generates the game scripts on the game test automation device based on a user input received from a tester using the test device to interact with a game test automation interface implemented by a test automation game build on the game test automation device, where the game test automation interface interacts with the test automation game build the same as the game play interface interacts with the Internet game build,
   wherein the combination of game scripts comprise information about location coordinates at which an operation is performed, an order where operations are performed, and duration of the operation,
   wherein the test report comprises information about performance of a test device in which the test is performed, a progress situation and a current state of a test scenario for each test interval, and image information in which a test situation is captured over a predetermined time period.

2. The game test automation device of claim 1, further comprising:
   a communication unit to perform communication with a test device which performs a test of the game service,
   wherein the processor generates a control signal for controlling the test device to perform a test on the test automation game build of the game service through the test device and transmits the generated control signal to the test device via the communication unit, performs the test on the test automation game build through the test device based on the transmitted control signal, and generates test result information about the test.

3. The game test automation device of claim 1, wherein the processor manages the game scripts and the test procedure information and generates the game scripts or the test procedure information based on a user input.

4. The game test automation device of claim 1, wherein the test procedure information includes information about an order where game scripts included in the test procedure information are executed.

5. The game test automation device of claim 1, wherein the test procedure information includes information about game scripts executed at the same time by a plurality of test devices among game scripts included in the test procedure information.

6. The game test automation device of claim 1, wherein the test report further includes at least one of information about a result of the performed test and log information.

7. The game test automation device of claim 6, wherein the log information includes at least one of image information in which a test situation is captured, text information about the test situation, log information of the test device, or web transmission log information called by the test device.

8. The game test automation device of claim 1, wherein the game state information is determined through image recognition.

9. The game test automation device of claim 1, wherein the game state information is determined based on a library embedded in the test automation game build of the game service.

10. The game test automation device of claim 1, wherein the game state information is determined based on log information generated in the process of performing the test.

11. The game test automation device of claim 1, further comprising:
a display unit to display a situation where the test proceeds.

12. The game test automation device of claim 11, wherein the display unit displays a screen of the test device in which the test is performed in real time.

13. A game test automation method by a game test automation device, the method comprising:
generating test procedure information which is a combination of game scripts to be tested in a game service;
performing a test on an Internet game build of the game service based on the generated test procedure information; and
generating game state information derived in the process of performing the test and a test report for the test by controlling a test device to use a game play interface to interact with an Internet game build based on the test procedure information obtained from the database,
wherein the generating of the test procedure information comprises generating the game scripts on the game test automation device based on a user input received from a tester using the test device to interact with a game test automation interface implemented by a test automation game build on the game test automation device, where the game test automation interface interacts with the test automation game build the same interface as the game play interface interacts with the Internet game build,
wherein the combination of game scripts comprise information about location coordinates at which an operation is performed, an order where operations are performed, and duration of the operation,
wherein the test report comprises information about performance of a test device in which the test is performed, a progress situation and a current state of a test scenario for each test interval, and image information in which a test situation is captured over a predetermined time period.

14. The method of claim 13, wherein the performing of the test includes:
generating a control signal for controlling a test device to perform a test on the test automation game build in the test device; and
transmitting the generated control signal to the test device,
wherein the generating of the game state information and the test report for the test is to generate game state information derived in the process of performing the test performed in the test device and a test report for the performed test.

15. The method of claim 13, wherein the test procedure information includes information about an order where game scripts included in the test procedure information are executed.

16. The method of claim 13, wherein the test procedure information includes information about game scripts executed at the same time by a plurality of test devices among game scripts included in the test procedure information.

17. The method of claim 13, wherein the test report includes at least one of information about a result of the performed test and log information.

18. The method of claim 17, wherein the log information includes at least one of image information in which a test situation is captured, text information about the test situation, log information of the test device, or web transmission log information called by the test device.

19. The method of claim 18, wherein the game state information is determined through image recognition or is determined based on a library embedded in the test automation game build of the game service.

* * * * *